United States Patent
Nagashima et al.

(10) Patent No.: US 9,070,417 B1
(45) Date of Patent: Jun. 30, 2015

(54) MAGNETIC DISK DEVICE AND METHOD FOR EXECUTING WRITE COMMAND

(71) Applicant: KABUSHIKI KAISHA TOSHIBA, Minato-ku (JP)

(72) Inventors: Yasuyuki Nagashima, Yokohama (JP); Masakazu Kitahara, Kunitachi (JP); Kiyotaka Sasaki, Kawasaki (JP); Michihiko Umeda, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/523,145

(22) Filed: Oct. 24, 2014

(30) Foreign Application Priority Data

Jul. 14, 2014 (JP) ................................. 2014-144308

(51) Int. Cl.
G11B 27/36 (2006.01)

(52) U.S. Cl.
CPC ...................................... G11B 27/36 (2013.01)

(58) Field of Classification Search
None
See application file for complete search history.

(56) References Cited

U.S. PATENT DOCUMENTS

| 5,448,719 | A |   | 9/1995  | Schultz et al. |
|-----------|---|---|---------|----------------|
| 5,584,012 | A | * | 12/1996 | Kojima et al. ................ 711/122 |
| 5,596,708 | A |   | 1/1997  | Weber |
| 7,890,553 | B2 | * | 2/2011  | Kawate et al. ................ 707/821 |
| 7,916,421 | B1 | * | 3/2011  | Liikanen et al. ............ 360/77.01 |
| 2002/0060955 | A1 | * | 5/2002  | Kumagai ................... 369/30.05 |
| 2003/0218951 | A1 | * | 11/2003 | Suzuki et al. .............. 369/53.24 |
| 2005/0152254 | A1 | * | 7/2005  | Suzuki ....................... 369/53.26 |
| 2005/0240814 | A1 | * | 10/2005 | Sasakura et al. ................ 714/14 |
| 2006/0069859 | A1 | * | 3/2006  | Hayasaka ..................... 711/112 |
| 2006/0069870 | A1 | * | 3/2006  | Nicholson et al. ............ 711/118 |
| 2006/0153033 | A1 | * | 7/2006  | Saito et al. ................. 369/47.33 |
| 2009/0003172 | A1 | * | 1/2009  | Yahata et al. .............. 369/53.41 |
| 2011/0158067 | A1 | * | 6/2011  | Harada et al. .............. 369/47.15 |

FOREIGN PATENT DOCUMENTS

JP        6-348600      12/1994

* cited by examiner

*Primary Examiner* — Peter Vincent Agustin
(74) *Attorney, Agent, or Firm* — Oblon, McClelland, Maier & Neustadt, L.L.P.

(57) ABSTRACT

According to one embodiment, a controller of a magnetic disk device starts to receive first data specified in a first write command from a host, and starts to write the first data to a disk in accordance with the first write command. The controller reports a status for execution of the first write command to the host depending on whether or not a second capacity of data not yet written to the disk is less than or equal to a first capacity of a first free space in a nonvolatile cache. The first free space is available to save data during a first period when a backup power supply enables power to be supplied. The second capacity decreases as writing of the first data to the disk progresses.

20 Claims, 5 Drawing Sheets

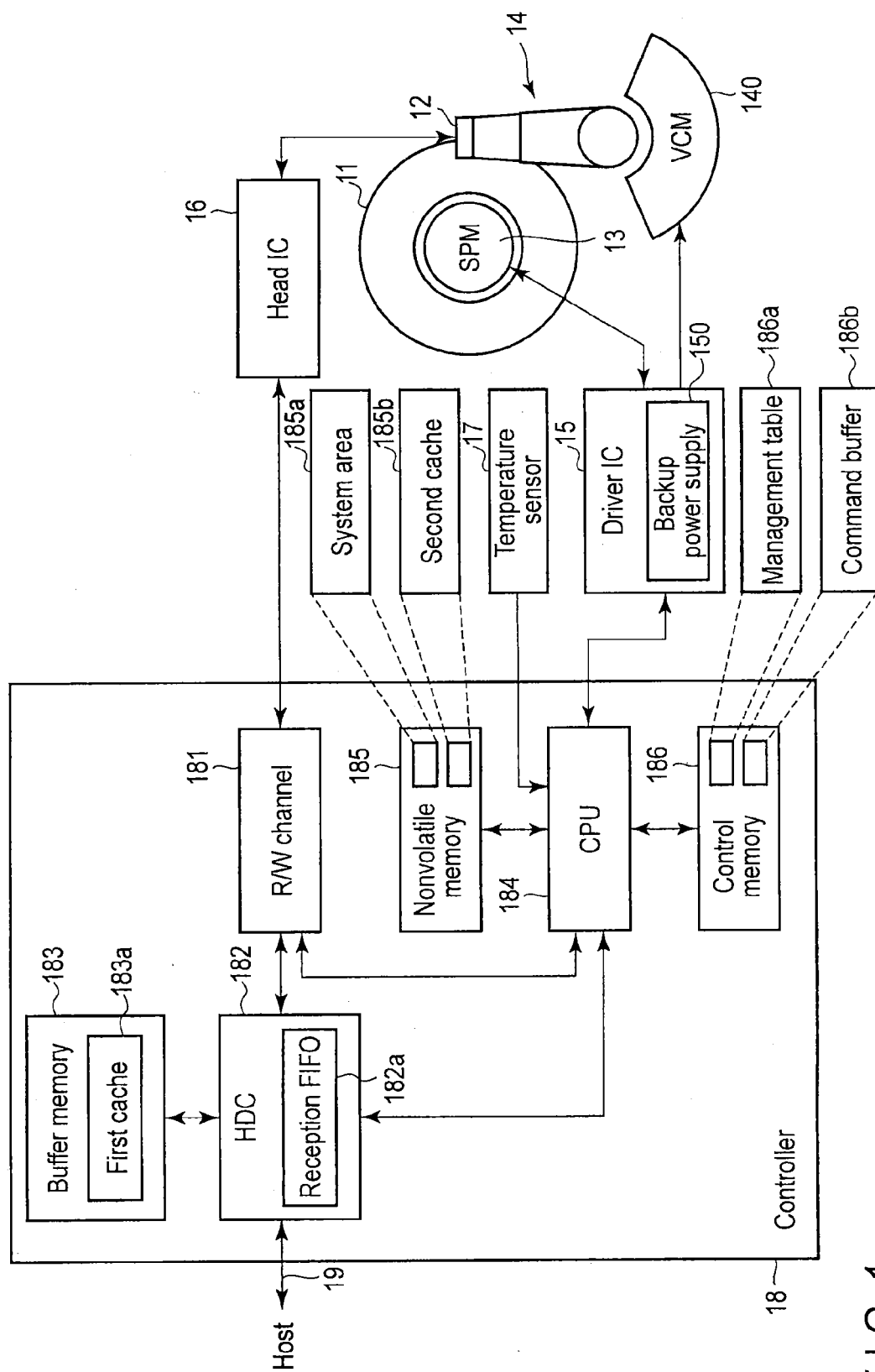
F I G. 1

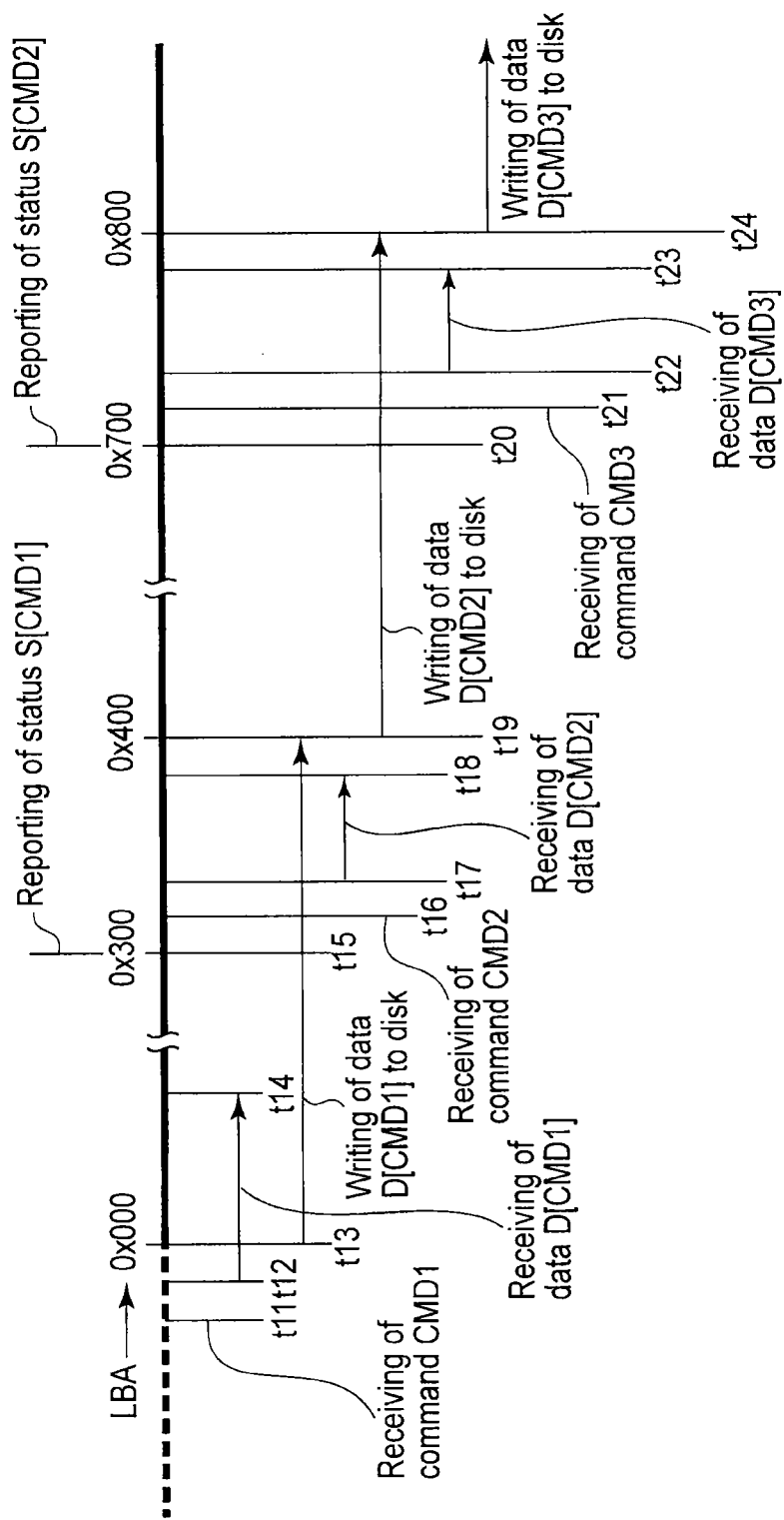
F I G. 6

MAGNETIC DISK DEVICE AND METHOD FOR EXECUTING WRITE COMMAND

CROSS-REFERENCE TO RELATED APPLICATIONS

This application is based upon and claims the benefit of priority from Japanese Patent Application No. 2014-144308, filed Jul. 14, 2014, the entire contents of which are incorporated herein by reference.

FIELD

Embodiments described herein relate generally to a magnetic disk device and a method for executing a write command.

BACKGROUND

In general, in accordance with a write command from a host apparatus, a magnetic disk device writes data of a data length specified in the write command (in other words, write data) to a disk. However, before the writing of the write data is completed, a power supply (more specifically, a main power supply) to the magnetic disk device may be interrupted. In this case, part of the write data (more specifically, data not yet written to the disk) may be lost.

Thus, recent magnetic disk devices have a power loss protection (PLP) function to secure write data even when the power supply is interrupted. The PLP function refers to a function to save data not yet written to the disk to a nonvolatile cache at a high speed when the power supply is interrupted. This saving operation is performed using power temporarily supplied by a backup power supply.

However, the amount of write data secured by the PLP function depends on, for example, the capacity of the nonvolatile cache. In other words, the amount of write data secured by the PLP function is limited. Thus, in general, after all of the write data is written to an area on the disk specified in the write command, the magnetic disk device reports a status for the execution of the write command (for example, a good status indicative of write completion) to a host. In this case, the host needs to wait to issue the next command to the magnetic disk device until the host receives the report of the status from the magnetic disk device. This may degrade the performance of the magnetic disk device.

BRIEF DESCRIPTION OF THE DRAWINGS

FIG. 1 is a block diagram showing an exemplary configuration of a magnetic disk device according to an embodiment;

FIG. 6 is a diagram illustrating a summary of an operation performed when three write commands are sequentially received according to the embodiment.

DETAILED DESCRIPTION

Figure 2:
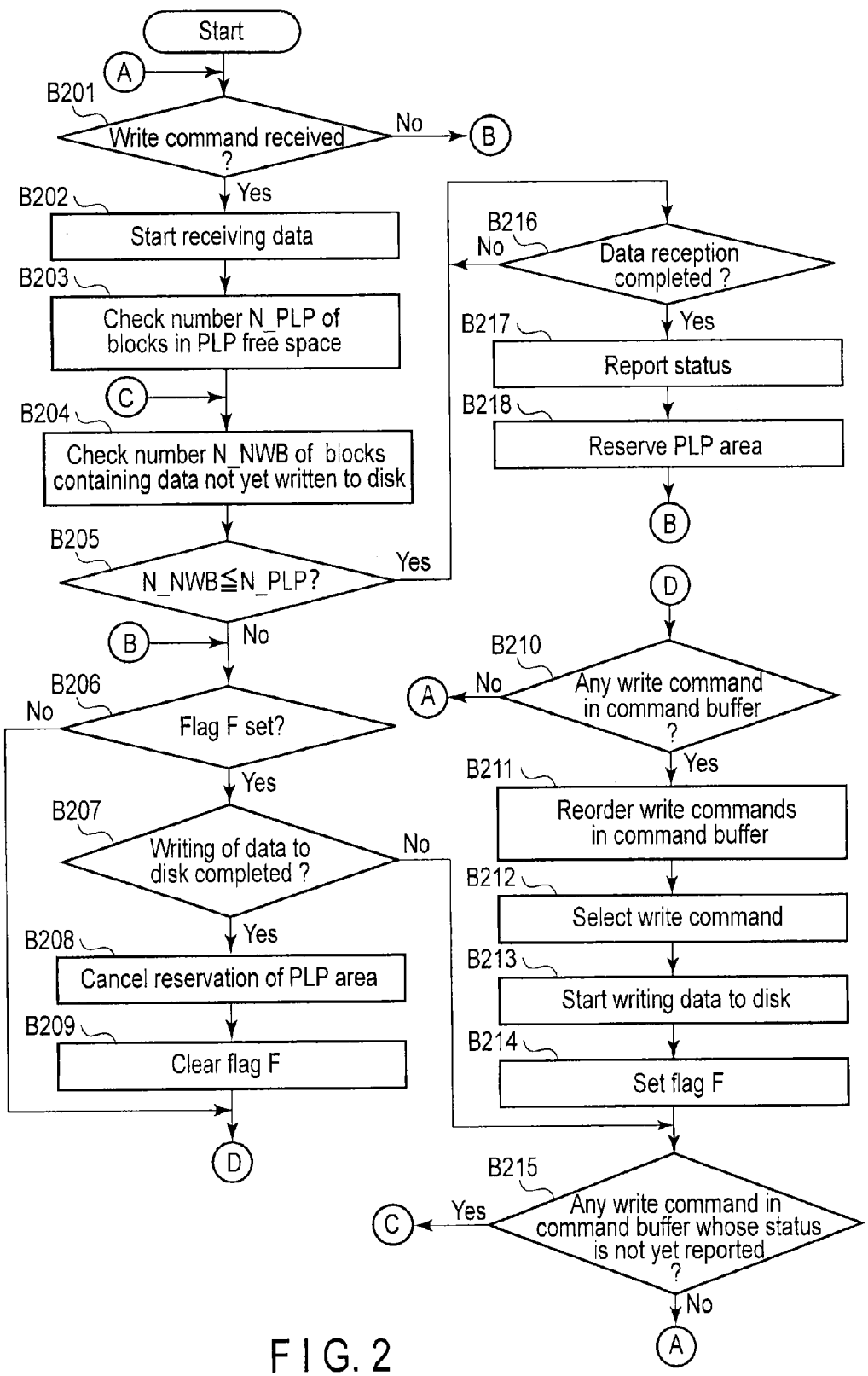
FIG. 2 is a flowchart illustrating an exemplary procedure for a write process according to the embodiment.

Various embodiments will be described hereinafter with reference to the accompanying drawings.

In general, according to one embodiment, a magnetic disk device comprises a disk, a nonvolatile cache, a controller, and a backup power supply. The backup power supply temporarily generates power supplied at least to the nonvolatile cache and the controller when main power to the magnetic disk device is interrupted. The controller starts to receive first data of a data length specified in a first write command when receiving the first write command from a host. The controller starts to write the first data to the disk in accordance with the first write command. The controller reports a status for execution of the first write command to the host depending on whether or not a second capacity of data not yet written to the disk is less than or equal to a first capacity of a first free space in the nonvolatile cache. The first free space is available to save data during a first period when the backup power supply enables power to be supplied. The second capacity decreases as writing of the first data to the disk progresses.

FIG. 1 is a block diagram showing an exemplary configuration of a magnetic disk device according to an embodiment. The magnetic disk device is also referred to as a hard disk drive (HDD). Thus, the magnetic disk device is hereinafter referred to as an HDD. The HDD shown in FIG. 1 comprises a disk (magnetic disk) 11, a head (magnetic head) 12, a spindle motor (SPM) 13, an actuator 14, a driver IC 15, a head IC 16, a temperature sensor 17, and a controller 18.

The disk 11 is a magnetic storage medium comprising, for example, on one surface, a recording surface on which data is magnetically recorded. The disk 11 is rotated at high speed by the SPM 13. The SPM 13 is driven by a driving current (driving voltage) supplied by the driver IC 15.

The disk 11 (more specifically, the recording surface of the disk 11) comprises, for example, a plurality of concentric tracks. The disk 11 may comprise spirally arranged tracks. The head 12 is arranged in association with the recording surface of the disk 11. The head 12 is attached to a tip of the actuator 14. The head 12 flies over the disk 11 as a result of high-speed rotation of the disk 11. The actuator 14 comprises a voice coil motor (VCM) 140 serving as a driving source for the actuator 14. The VCM 140 is driven by a driving current (voltage) supplied by the driver IC 15. When the actuator 14 is driven by the VCM 140, this causes the head 12 to move over the disk 11 in the radial direction of the disk 11 so as to draw an arc.

Unlike the configuration shown in FIG. 1, the HDD may comprise a plurality of disks. Alternatively, the disk 11 shown in FIG. 1 may comprise recording surfaces on both surfaces of the disk 11, and heads may be arranged in association with both the recording surfaces.

The driver IC 15 drives the SPM 13 and the VCM 140 in accordance with the control of the controller 18 (more specifically, a CPU 184 in the controller 18). The driver IC 15 includes a backup power supply 150.

When a power supply (hereinafter referred to as a main power supply) to the HDD is interrupted, the backup power supply 150 generates power instead of the main power supply. That is, the backup power supply 150 generates power used to maintain the minimum needed operation of the HDD when the main power supply is interrupted. The generated power is supplied at least to the controller 18 in the HDD (more specifically, an HDC 182, a buffer memory 183, a CPU 184, a nonvolatile memory 185, and a control memory 186). The backup power supply 150 uses back electromotive force from the SPM 13 to generate the power. When the main power supply is interrupted, a first period T1 during which the backup power supply 150 can supply power generally depends on power consumed to maintain the minimum needed operation of the HDD and the environmental temperature of the HDD. The environmental temperature of the HDD is detected by the temperature sensor 17 as described below.

The minimum needed operation includes a head unload operation controlled by the controller 18 when the head 12 is flying over the disk 11. The head unload operation refers to an operation for unloading (in other words, retracting) the head 12 to a particular area referred to as a ramp and located outside an outer periphery of the disk 11. When the head unload operation is needed, the power generated by the backup power supply 150 is supplied to at least the driver IC 15 in addition to the controller 18. Furthermore, the minimum needed operation includes a first PLP operation performed by the controller 18. The first PLP operation will be described below.

The head IC 16 includes a head amplifier to amplify a signal (in other words, a read signal) read by the head 12 (more specifically, a read element in the head 12. The head IC 16 further includes a write driver to convert write data transmitted by the controller 18 (more specifically, an R/W channel 181 in the controller 18) into a write current and transmit the write current to the head (more specifically, a write element in the head 12). The temperature sensor 17 detects the temperature (environmental temperature) of the HDD shown in FIG. 1.

The controller 18 is implemented using, for example, a large-scale integrated circuit (LSI) referred to as a system-on-a-chip (SOC) and comprising a plurality of elements integrated on a single chip. The controller 18 comprises the read/write (R/W) channel 181, the hard disk controller (HDC) 182, the buffer memory 183, the CPU 184, the nonvolatile memory 185, and the control memory 186.

The R/W channel 181 processes signals related to reading and writing. The R/W channel 181 digitizes the read signal and decodes the digitized data into read data. The R/W channel 181 also extracts servo data needed to position the head 12 from the digitized data. The R/W channel 181 further encodes write data.

The HDC 182 is connected to the host via the host interface 19. The HDC 182 receives commands (a write command, a read command, and the like) transferred by the host. The HDC 182 controls the data transfer between the host and the HDC 182. The HDC 182 includes a FIFO buffer (hereinafter referred to as a reception FIFO) 182a. The reception FIFO 182a is used to receive, from the host, data specified in a write command (write data) from the host. The HDC 182 further controls the data transfer between the HDC 182 and the buffer memory 183 and the data transfer between the HDC 182 and the R/W channel 181.

The buffer memory 183 is configured using a volatile memory such as a dynamic RAM (DRAM). The buffer memory 183 is used to temporarily store data to be written to the disk 11 (write data) and data read from the disk 11. A part of a storage area in the buffer memory 183 is used as a volatile cache (hereinafter referred to as a first cache) 183a. The first cache 183a is used to temporarily store write data received via the reception FIFO 182a of the HDC 182.

The CPU 184 functions as a main controller for the HDD shown in FIG. 1. The CPU 184 controls at least some other elements in the HDD in accordance with a control program. According to the embodiment, the control program is stored in a particular area in the disk 11. When the main power supply is turned on, at least a part of the control program is loaded into the control memory 186 for use.

The nonvolatile memory 185 is a rewritable nonvolatile memory such as a NAND flash memory. A part of a storage area in the nonvolatile memory 185 is used as a system area 185a. In the embodiment, an initial program loader (IPL) is pre-stored in a part of the system area 185a. The CPU 184 executes the IPL, for example, when the main power supply is turned on, and thus loads at least a part of the control program stored in the disk 11 into the control memory 186. Another part of the system area 185a is used to save system information such as a management table 186a when the main power supply is interrupted.

Another part of the storage area in the nonvolatile memory 185 is used as a nonvolatile cache (hereinafter referred to as a second cache) 185b. The second cache 185b is used to save data not yet written to the disk 11 and left in the first cache 183a when the main power supply is interrupted. The capacity of the second cache 185b is generally smaller than the capacity of the first cache 183a. In the embodiment, the capacity of the second cache 185b is assumed to be 1 megabyte (MB), and the capacity of the first cache 183a is 64 MB (or 128 MB).

The control memory 186 is, for example, a volatile memory such as DRAM. A part of a storage area in the control memory 186 is used to store at least a part of the control program. Another part of the storage area in the control memory 186 is used to store the management table 186a. The management table 186a contains first cache directory information and second cache directory information both used to manage the locations of data in the first cache 183a and the second cache 185b in units of blocks each of a given size. Yet another part of the storage area in the control memory 186 is used as a command buffer 186b. The command buffer 186b is used to store a queue of write commands received by the HDC 182.

Now, with reference to FIG. 2, operations of the embodiment will be described taking, as an example, a write process including writing of data to the disk 11. FIG. 2 is a flowchart illustrating an exemplary procedure for the write process. It is assumed that no write command is now stored in the command buffer 186b. It is assumed that, in this state, the host issues a write command (first write command) CMD to the HDD shown in FIG. 1 and that the HDC 182 in the HDD receives the write command CMD. The CPU 184 stores the write command CMD received by the HDC 182 in the command buffer 186b.

Before description of the write process, a write cache enable (WCE) bit will be described. The write command CMD received by the HDC 182 generally includes a WCE bit. When the WCE bit is 1, the write command CMD requests the HDD to report the status (in other words, the status for the execution of the write command CMD) to the host at the time when the reception of data of a data length specified in the write command CMD is completed. Data of the data length specified in the write command CMD is hereinafter referred to as data D[CMD]. The status is hereinafter referred to as S[CMD].

The completion of reception of the data D[CMD] refers to that the data D[CMD] is received by the HDC 182 and that all the received data D[CMD] is stored in the first cache 183a by the HDC 182. When the first cache 183a is a volatile cache as is the case with the embodiment, if the main power supply is interrupted after the status S[CMD] is reported and before the writing of the received data D[CMD] to the disk 11 is completed, the received data D[CMD] may be partly lost.

In contrast, when the WCE bit is 0, according to the conventional technique, the write command CMD requests the HDD to report the status S[CMD] to the host at the time when the writing of the data D[CMD] to the disk 11 is completed. In this case, even when the first cache 183a is a volatile cache as is the case with the embodiment and the main power supply is interrupted after the status S[CMD] is reported, there is no possibility of losing the received data D[CMD]. However, the reporting of the status S[CMD] to the host is later than in a case where the WCE bit is 1, causing a delay in the issuance of the next command to the HDD by the host. This may degrade the performance of the HDD.

The embodiment assumes that the WCE bit is 0. However, the embodiment applies a new configuration in which the HDD reports the status S[CMD] to the host before the writing of the data D[CMD] to the disk 11 is completed.

In the embodiment, when the HDD shown in FIG. 1 is in a normal operation state, a write process shown in a flowchart in FIG. 2 is steadily executed. First, at the beginning of the write process, the CPU 184 determines whether or not the write command CMD has newly been received (B201). When the write command CMD has been received as is the case with this example (Yes in B201), the CPU 184 requests the HDC 182 to receive data (in other words, write data) D[CMD] of a data length specified in the write command CMD. Then, the HDC 182 starts an operation of receiving the data (first data) D[CMD] from the host via the reception FIFO 182a (B202). In B202, the HDC 182 also starts an operation of storing the received data in the first cache 183a, for example, in units of blocks. In B202, the CPU 184 starts an operation of updating the management table 186a (more specifically, the first cache directory information contained in the management table 186a) in accordance with the above-described operation of the HDC 182.

Then, the CPU 184 checks the capacity (hereinafter referred to as the PLP free space capacity) FS_PLP of a first free space (hereinafter referred to as a PLP free space) in the second cache 185b which is available to save data during a PLP operation (B203). The PLP free space capacity (first capacity) FS_PLP is the amount of data secured by the PLP operation. In B203, the CPU 184 calculates the number N_PLP of blocks that can be stored in the current PLP free space based on the PLP free space capacity FS_PLP. In other words, in B203, the CPU 184 checks the number N_PLP of blocks in the PLP free space.

Now, the PLP free space and the PLP free space capacity FS_PLP will be described. First, the amount of data that can be written to the nonvolatile memory 185 (more specifically, the second cache 185b in the nonvolatile memory 185) during the above-described first period T1 is denoted by Qd. Qd depends on the first period T1 and a speed at which writing is performed on the nonvolatile memory 185 at the environmental temperature of the HDD. For simplification of description, Qd is assumed to be the capacity of N blocks where N is an integer of one or larger. Furthermore, the capacity of a physical free space in the second cache 185b is denoted by FS.

The capacity FS of the physical free space is equal to the capacity of the second cache 185b when a PLP area described below is not reserved. In contrast, when the PLP area is reserved, the capacity of the physical free space is smaller than the capacity of the second cache 185b by the reserved amount.

In the embodiment, the CPU 184 determines the PLP free space capacity FS_PLP as follows based on Qd and FS. First, Qd is assumed to be greater than or equal to FS. In this case, the CPU 184 determines the physical free space in the second cache 185b to be the PLP free space, and determines the capacity equal to FS to be the PLP free space capacity FS_PLP. In contrast, when Qd is smaller than FS, the CPU 184 determines a part of the physical free space in the second cache 185b the capacity of which is equal to Qd to be the PLP free space. In this case, the CPU 184 determines the capacity equal to Qd to be the PLP free space capacity FS_PLP.

For example, when the capacity FS of the current physical free space in the second cache 185b is 1 MB and Qd is 1.5 MB (FS<Qd), the PLP free space capacity FS_PLP is limited to the amount equal to FS, that is, 1 MB (FS_PLP=FS=1 MB). In contrast, even when FS is 1 MB, if Qd is, for example, 0.8 MB (FS>Qd), the PLP free space capacity FS_PLP is limited to the amount equal to Qd, that is, 0.8 MB (FS_PLP=Qd=0.8 MB).

Upon executing B203, the CPU 184 proceeds to B204. In B204, the CPU 184 checks the number N_NWB of blocks containing data not yet written to the disk 11 during the writing of the data D[CMD] to the disk 11 specified in the write command CMD (B204). In this regard, the writing of the data D[CMD] to the disk 11 has not been started yet. In this case, N_NWB is equal to the number of blocks indicated by the data length specified in the write command CMD.

Then, the CPU 184 compares N_NWB (second amount) with N_PLP (first capacity), thereby determining whether N_NWB is less than or equal to N_PLP (B205). In this example, N_NWB is assumed to be larger than N_PLP. In other words, it is assumed that the CPU has not detected a state (hereinafter referred to as a first state) where N_NWB is less than or equal to N_PLP (No in B205). In this case, the CPU 184 determines that the PLP function fails to be provided if the main power supply is interrupted while N_NWB>N_PLP. Thus, the CPU 184 proceeds to B206.

In B206, the CPU 184 determines whether flag F is set. Flag F is clear in a state where writing of data to the disk 11 is being performed and is set in response to the start of writing of data to the disk 11. Furthermore, flag F is cleared when the completion of the writing of data to the disk 11 is confirmed. In other words, flag F indicates whether or not the writing of data to the disk 11 is being performed.

This example assumes that the writing of data to the disk 11 is not being performed and that flag F is thus clear. When flag F is clear (No in B206), the CPU 184 skips B207 to B209, and proceeds to B210. In B210, the CPU 184 determines whether at least one write command to be executed is present in the command buffer 186b.

The write command to be executed refers to the write command for which the writing to the disk 11 specified in the write command has not been started (in other words, the command that has not been executed yet). In the embodiment, a flag F1 is used to indicate whether a command stored in the command buffer 186b is a write command to be executed.

For example, when a write command received by the HDC 182 is stored in the command buffer 186b, flag F1 is stored in the command buffer 186b in association with the received command. In this regard, flag F1 is indicative of that the write command corresponding to flag F1 is to be executed (that is, the write command has not been executed yet). When execution of the corresponding write command is started, flag F1 is changed to a status indicative of that the write command is in execution. Flag F1 associated with the write command CMD is hereinafter referred to as a flag F1[CMD].

When at least one write command to be executed is present (Yes in B210), the CPU 184 proceeds to B211. The contents of processing in B211 depend on whether a plurality of write commands to be executed or a single write command to be executed is present in the command buffer 186b as described below.

When a plurality of write commands to be executed is present, the CPU 184 reorders the plurality of write commands to be executed based on the ranges of writing specified in the plurality of write commands to be executed, respectively (B211). The reordering is performed so as to allow the disk 11 to be most efficiently accessed when the plurality of write commands to be executed is executed in the order of arrangement of the reordered plurality of write commands to be executed. In other words, the plurality of write commands to be executed is reordered so as to minimize a rotational delay time (or a seek time) for the disk when the write command to be executed is switched. In contrast, when a single write command to be executed is present, the reordering is not performed. This is equivalent to skipping B211.

When the reordering is performed in B211, the CPU 184 selects the next write command to be executed in accordance with the order of arrangement of the reordered plurality of write commands to be executed (B212). In contrast, when the reordering is not performed in B211, the CPU 184 selects a single write command to be executed (B212).

It is assumed that only the write command CMD is present in the command buffer 186b and that the write command CMD is selected as a write command to be executed. In this case, the CPU 184 starts an operation of writing the data D[CMD] received by the HDC 182 and stored in the first cache 183a to an area on the disk 11 specified in the selected write command CMD (B213).

In general, the write command specifies an area to which data is to be written, using a starting logical block address LBA and a data length. The data length is generally indicated by the number of blocks. For example, when the starting logical block address LBA is LBA0 and the data length is L, the write command CMD specifies that the data be written to an area of L blocks starting with the LBA0. However, the area of L blocks specified in the write command CMD is a logical area recognized by the host and is not a physical area on the disk 11. Thus, the CPU 184 translates the starting logical block address LBA into a physical address on the disk 11, for example, based on a well-known address translation table. The physical address typically comprises a head number, a cylinder number, and a sector number. The CPU 184 starts to write the data D[CMD] to the disk 11 based on the physical address. However, for simplification, it is hereinafter assumed that the writing of the data D[CMD] to the disk 11 is based on the logical block address LBA.

Upon starting to write the data D[CMD] to the disk 11 (B213) as described above, the CPU 184 sets flag F (B214). Thus, flag F is indicative of that data writing to the disk 11 is in execution. Furthermore, in B214, the CPU 184 changes flag F1[CMD] stored in the command buffer 186b in association with the write command CMD to a status indicative of that the write command CMD is in execution.

Then, the CPU 184 determines whether the command buffer 186b contains any write command for which the status has not yet been reported (B215). In the embodiment, a flag F2 is used to indicate whether or not the status for a write command present in the command buffer 186b has been reported.

For example, when a write command received by the HDC 182 is stored in the command buffer 186b, flag F2 is stored in the command buffer 186b in association with the received write command. In this regard, flag F2 is indicative of that the status for the execution of the write command corresponding to flag F2 has not yet been reported. When the status for the execution of the corresponding write command is reported to the host, flag F2 is changed to a status indicative of that the status has been reported. Flag F2 associated with the write command CMD is hereinafter referred to as flag F2[CMD].

When the command buffer 186b contains no write command for which the status has not yet been reported (No in B215), the CPU 184 returns to B201 (in other words, the beginning of the write process). In the embodiment, the write process ends when the main power supply to the HDD is interrupted or when the HDD shifts a particular power save mode. The particular power save mode is, for example, a mode where the head 12 is retracted to the above-described ramp or a mode where rotation of the SPM 13 is stopped after the head 12 is retracted to the ramp.

On the other hand, when the command buffer 186b contains a write command for which the status has not yet been reported (Yes in B215), the CPU 184 returns to B204. In this example, the command buffer 186b contains a write command CMD for which the status has not yet been reported. Thus, the CPU 184 returns to B204, and checks again the current number N_NWB of blocks containing data not yet written to the disk 11 after writing of the data D[CMD] to the disk 11 is started. The CPU 184 then determines whether N_NWB is less than or equal to N_PLP (B205).

This example assumes that N_NWB is still larger than N_PLP (No in B205). In this case, the CPU 184 determines whether flag F is set as described above (B206). In this example, flag F is set (Yes in B206). In this case, the CPU 184 proceeds to B207. In B207, the CPU 184 determines whether the writing of the data D[CMD] to the disk 11 started in B213 is completed. If the writing of the data D[CMD] to the disk 11 is not completed (No in B207), the CPU 184 returns to B204 via B215, and checks the current number N_NWB of blocks containing data not yet written to the disk 11. The CPU 184 then determines whether N_NWB is less than or equal to N_PLP (B205). In other words, the CPU 184 waits for N_NWB to become less than or equal to N_PLP as a result of the progress of the writing of the data D[CMD] to the disk 11 which is in execution.

It is assumed that N_NWB has eventually become less than or equal to N_PLP (Yes in B205). In this case, the CPU 184 determines that, even when the main power supply to the HDD is interrupted before the data writing to the disk 11 is completed, the data not yet written to the disk 11 can be reliably written to the PLP free space in the second cache 185b. The CPU 184 thus proceeds to B216. That is, upon detecting a particular state where N_NWB becomes less than or equal to N_PLP (first state), the CPU 184 proceeds to B126. In B216, the CPU 184 determines whether the reception of the data D[CMD] started in B202 is completed.

This example assumes that the reception of the data D[CMD] is completed (Yes in B216). In contrast, when the reception of the data D[CMD] is not completed (No in B216), the CPU 184 waits for the reception of the data D[CMD] to be completed.

Upon confirming that the reception of the data D[CMD] is completed (Yes in B216), the CPU 184 proceeds to B217. In B217, the CPU 184 requests the HDC 182 to report the status S[CMD] for the execution of the write command CMD to the host. That is, upon detecting the state where N_NWB is less than or equal to N_PLP, the CPU 184 allows the HDC 182 to report the status S[CMD] (more specifically, the status S[CMD] indicative of write completion) without waiting for the writing of the data D[CMD] to the disk 11 to be completed.

Thus, the embodiment enables write data to be secured even when power supply interruption occurs after the status S[CMD] is reported and before the writing of the data D[CMD] to the disk 11 is completed. That is, the embodiment allows the write data to be secured when power supply interruption occurs even though the reporting of the status to the host is made earlier. In B217, the CPU 184 changes flag F2[CMD] stored in the command buffer 186b in association with the write command CMD to a status indicative of that the status has been reported.

Then, the CPU 184 uses the management table 186a (more specifically, the second cache directory information), and thus reserves a portion of the PLP free space which corresponds to N_NWB in association with the write command CMD as an area needed for the PLP operation (hereinafter referred to as the PLP area) (B218). The reservation reduces N_PLP by N_NWB (N_PLP=N_PLP−N_NWB). B218 may be executed before B217.

Upon executing B217 and B218, the CPU 184 returns (or proceeds) to B206. In B206, the CPU 184 determines whether flag F is set. When flag F is set as in this example (Yes in B206), the CPU 184 determines whether the writing of the data D[CMD] to the disk 11 is completed (B207).

If the writing of the data D[CMD] to the disk 11 is not completed (No in B207), the CPU 184 proceeds to B215. In B215, the CPU 184 determines whether the command buffer 186b contains any write command for which the status has not yet been reported. In this example, the command buffer 186b contains no write command for which the status has not yet been reported (No in B215). In this case, the CPU 184 returns to B201.

In B201, the CPU 184 determines whether a new write command has been received as described above. This example assumes that no new write command has been received which follows the write command CMD (No in B201). In this case, the CPU 184 proceeds to B206, and determines whether flag F is set. When flag F is set as in this example (Yes in B206), the CPU 184 proceeds to B207. In B207, the CPU 184 determines whether the writing of the data D[CMD] to the disk 11 is completed, as described above. If the writing of the data D[CMD] is not completed (No in B207), the CPU 184 returns to B207 via B215, B201, and B206. In other words, the CPU 184 waits for the writing of the data D[CMD] to the disk 11 to be completed.

It is assumed that the writing of the data D[CMD] to the disk 11 is eventually completed (Yes in B207). In this case, the CPU 184 cancels the reservation of the PLP area performed in B218 (B208). The cancellation of the reservation increases N_PLP by the number of blocks in the released PLP area. In B208, the CPU 184 deletes the write command CMD (more specifically, a set of the write command CMD, flag F1[CMD], and flag F2[CMD]) from the command buffer 186b. The CPU 184 then clears flag F (B209). B209 may be executed before B208.

Upon executing B208 and B209, the CPU 184 proceeds to B210. In B210, the CPU 184 determines whether the command buffer 186b contains a write command to be executed. If the command buffer 186b contains no write command to be executed (No in B210), the CPU 184 returns to B201.

In B201, the CPU 184 determines whether a new write command has been received as described above. This example assumes that no new write command has been received which follows the write command CMD (No in B201). In this case, the CPU 184 proceeds to B206, and determines whether flag F is set. When flag F is clear as in this example (No in B206), the CPU 184 proceeds to B210. In B210, the CPU 184 determines whether the command buffer 186b contains a write command to be executed, as described above. If the command buffer 186b contains no write command to be executed (No in B210), the CPU 184 returns to B201. In other words, when the command buffer 186b contains no write command to be executed, the CPU 184 waits for a write command to be received.

It is assumed that, after the write command CMD is determined to have been received (Yes in B201), N_NWB is determined to be less than or equal to N_PLP at the first time operation in B205 (Yes in B205). Such a state occurs, for example, when the write command CMD specifies a small data length, in other words, a small amount of data D[CMD] (a small number of blocks). In this case, when the reception of the data D[CMD] is completed (Yes in B216), the status S[CMD] is immediately reported to the host (B217).

Figure 3:
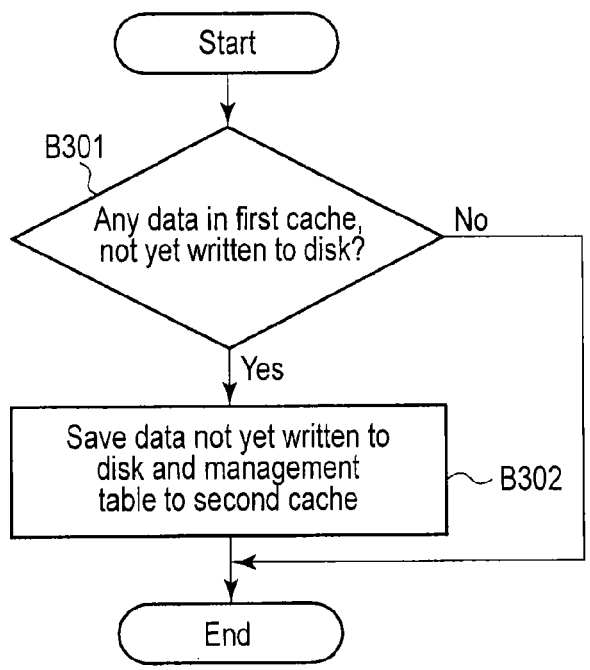
FIG. 3 is a flowchart illustrating an exemplary procedure for a first power loss protection (PLP) operation performed when a power supply is interrupted according to the embodiment.

Now, a first PLP operation performed when the main power supply is interrupted will be described with reference to FIG. 3. FIG. 3 is a flowchart illustrating an exemplary procedure for the first PLP operation. When the main power supply is interrupted, the CPU 184 receives power temporarily supplied by the backup power supply 150 to perform the minimum operation needed for the HDD. Specifically, when the head 12 is flying over the disk 11, the CPU 184 performs a head unload operation and then performs a first PLP operation as described below.

First, the CPU 184 determines whether the first cache 183a contains data not yet written to the disk 11, based on the management table 186a (B301). This example assumes that the main power supply is interrupted after the reporting of the status S[CMD] to the host and the reservation of the PLP area (B217 and B218) and before the writing of the data D[CMD] to the disk 11 is completed. In this case, the first cache 183a contains data not yet written to the disk 11 (what is called dirty data) (Yes in B301). The unwritten data is identified based on the management table 186a (more specifically, the first cache directory information contained in the management table 186a).

Thus, the CPU 184 reads data not yet written to the disk 11 from the first cache 183a and saves the read unwritten data to the PLP free space in the second cache 185b (more specifically, the second cache 185b in the nonvolatile memory 185) at a high speed (B302). In B302, the CPU also updates the management table 186a (more specifically, the second cache directory information contained in the management table 186a) based on the saving of the unwritten data. In B302, the CPU 184 further saves the updated management table 186a (more specifically, at least the second cache directory information) to the system area 185a in the nonvolatile memory 185.

In this regard, the number of blocks containing unwritten data left in the first cache 183a at the time when the main power supply is interrupted is less than or equal to the latest number N_NWB of blocks checked in B204, and is thus less than or equal to the number N_PLP. Hence, the data not yet written to the disk 11 and read from the first cache 183a is reliably saved to the second cache 185b during the first period T1 when power can be supplied by the backup power supply 150.

Upon executing B302, the CPU 184 ends the first PLP operation. On the other hand, when the first cache 183a contains no data not yet written to the disk 11 (No in B301), the CPU 184 skips B302 to end the first PLP operation.

Figure 4:
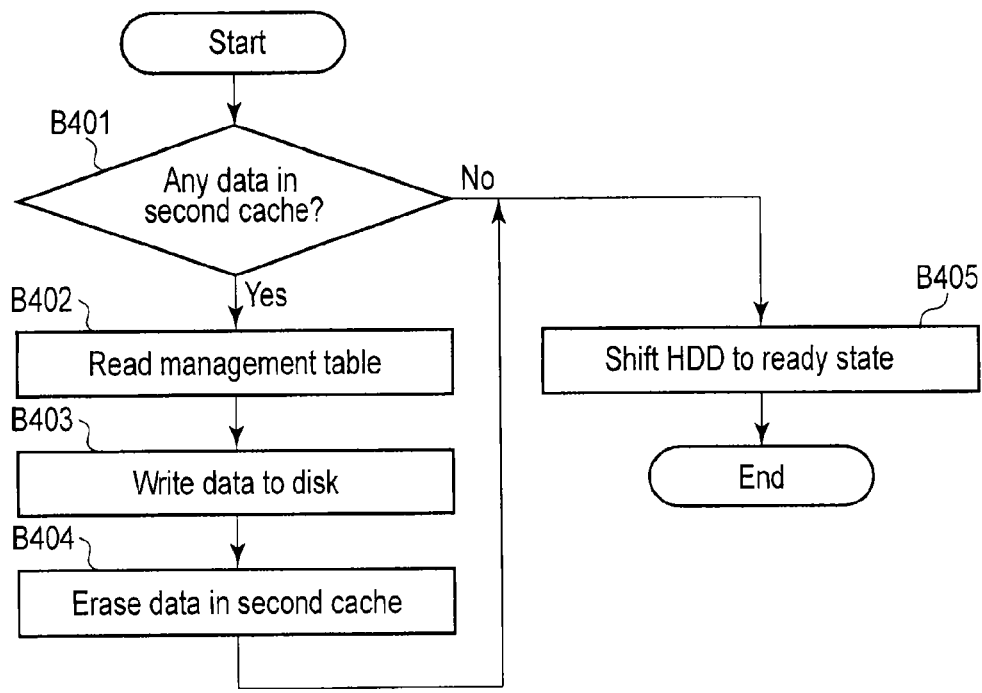
FIG. 4 is a flowchart illustrating an exemplary procedure for a second PLP operation performed when the power supply is turned on according to the embodiment.

Now, a second PLP operation performed when the main power supply is turned on will be described with reference to FIG. 4. FIG. 4 is a flowchart illustrating an exemplary procedure for the first PLP operation. When the main power supply is turned on (or recovered), the CPU 184 executes the IPL stored in the system area 185a in the nonvolatile memory 185 to control the driver IC 15 based on the IPL. The CPU 184 thus allows the driver IC 15 to drive the SPM 13 and the VCM 14 to load the head 12 onto the disk 11. In this state, based on the IPL, the CPU 184 loads at least a part of the control program stored in the disk 11 into the control memory 186.

Then, based on the control program, the CPU 184 performs the second PLP operation as follows.

First, the CPU 184 determines whether the second cache 185b contains data (more specifically, valid data) (B401). When the data in the second cache 185b has not been erased, the CPU 184 determines that the second cache 185b contains data (Yes in B401). In this case, the CPU 184 proceeds to B402. In B402, the CPU 184 reads the management table 186a saved in the system area 185a in the nonvolatile memory 185 and stores the read management table 186a in the control memory 186.

Then, the CPU 184 performs a write operation of writing, to the disk 11, the data saved in the second cache 185b in the nonvolatile memory 185, in other words, the data not yet written to the disk 11 at the time when the main power supply is interrupted (B403). When the write operation (B403) is started, the CPU 184 identifies an area in the second cache 185b in which the data not yet written to the disk 11 is saved and an area on the disk 11 to which the data is written, based on the management table 186a (more specifically, the second cache directory information) stored in the control memory 186.

Upon executing B403, the CPU 184 erases the data in the second cache 185b (B404) and then proceeds to B405. On the other hand, when the second cache 185b contains no data (No in B401), the CPU 184 skips B402 to B404, and proceeds to B405. In B405, the CPU 184 shifts the HDD to a ready state (what is called a drive ready state) where the HDD can receive a command from the host. Thus, the CPU 184 ends the second PLP operation.

In the first PLP operation, when the first cache 183a contains no data not yet written to the disk 11 (No in B301), the CPU 184 may save the management table 186a (more specifically, at least the second cache directory information) to the system area 185a in the nonvolatile memory 185. In this case, the CPU 184 may reverse the execution order of B401 and B402 in the second PLP operation. That is, the CPU 184 may read, at the beginning of the second PLP operation, the management table 186a saved in the system area 185a in the nonvolatile memory 185 and store the read management table 186a in the control memory 186. Then, based on the management table 186a stored in the control memory 186, the CPU 184 may determine whether the second cache 185b contains data.

Figure 5:
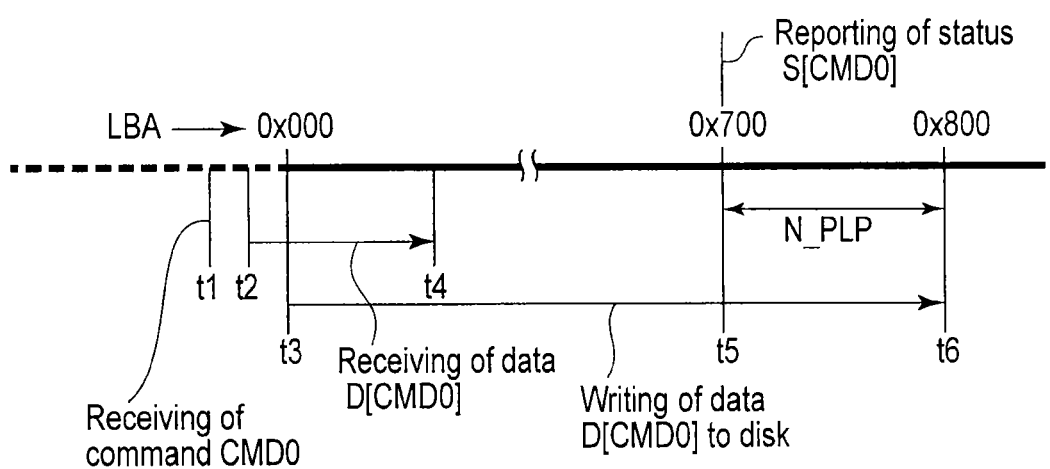
FIG. 5 is a diagram illustrating a summary of an operation performed when a single write command is received according to the embodiment.

Now, a specific example of operations of the embodiment will be described. FIG. 5 is a diagram illustrating a summary of an operation performed when a single write command CMD0 is received. Points in time t1 to t6 in FIG. 5 are assumed to have the following relationship:
t1<t2<t3<t4<t5<t6.

The write command CMD0 specifies that, for example, the data D[CMD0] be written to an area starting with a logical block address LBA of 0x000 (LBA=0x000) and including blocks the number of which is indicated by 0x800 (in other words, the area ranging from 0x000 to 0x7FF). In this regard, 0x in 0x000 and 0x800 is indicative of that the subsequent 000 and 800 are in a hexadecimal form.

First, it is assumed that, with no write command present in the command buffer 186b, the HDC 182 receives the write command CMD0 from the host and stores the write command CMD0 in the command buffer 186b, at time t1. In this case, when the reception of the write command CMD0 is confirmed (Yes in B201), the reception of the data D[CMD0] is started at time t2 (B202). In the example in FIG. 5, the reception of the data D[CMD0] is completed at time t4.

When the reception of the data D[CMD0] is started, the CPU 184 checks the number of blocks that can be secured by the PLP operation, in other words, the number N_PLP of blocks in the PLP free space (B203). In this example, N_PLP is assumed to be 0x100. Subsequently, the CPU 184 checks the number N_NWB of blocks containing data not yet written to the disk 11 during the writing of the data D[CMD0] to the disk 11 (B204). At this time, the writing of the data D[CMD0] to the disk 11 has not been started, and thus, N_NWB is 0x800. Furthermore, no other data has been written to the disk 11. In other words, N_NWB is not less than or equal to N_PLP (No in B205), and flag F is clear (No in B206). In this case, the writing of the data D[CMD0] to the disk 11 is started at time t3, and flag F is set (B210 to B214).

It is assumed that the writing of the data D[CMD0] to the disk 11 progresses, thereby reducing the number N_NWB of blocks containing data not yet written to the disk 11 to 0x100, which is equal to N_PLP at time t5. Then, N_NWB is determined to be less than or equal to N_PLP (Yes in B205), and a status S[CMD0] is reported to the host (B217). The writing of the data D[CMD0] to the disk 11 continues even after the reporting of the status S[CMD0]. In the example shown in FIG. 5, writing of the data D[CMD0] to the disk 11 is completed at time t6.

Now, it is assumed that, unlike in the example shown in FIG. 5, power supply interruption occurs after time t5 and before time t6. The number of blocks containing data not yet written to the disk 11 by this point in time is less than or equal to 0x100 (N_PLP). Thus, the CPU 184 can save all of the data not yet written to the disk 11 to the PLP area in the second cache 185b (B302).

FIG. 6 is a diagram illustrating a summary of an operation performed when three write commands CMD1, CMD2, and CMD3 for sequential write are received in order. Points in time t11 to t24 in FIG. 6 are assumed to have the following relationship:
t11<t12<t13<t14<t15<t16<t17<t18<t19<t20<t21<t22< t23<t24.

The write command CMD1 specifies that, for example, the data D[CMD1] be written to an area starting with a logical block address LBA of 0x000 and including blocks the number of which is indicated by 0x400 (in other words, the area ranging from 0x000 to 0x3FF). The write command CMD2 specifies that, for example, the data D[CMD2] be written to an area starting with a logical block address LBA of 0x400 and including blocks the number of which is indicated by 0x400 (in other words, the area ranging from 0x400 to 0x7FF). The write command CMD3 specifies that, for example, the data D[CMD3] be written to an area starting with a logical block address LBA of 0x800 and including blocks the number of which is indicated by 0x400 (in other words, the area ranging from 0x800 to 0xBFF). In this case, as described below, the write commands CMD1, CMD2, and CMD3 are sequentially executed to sequentially write the data to the area ranging from 0x000 to 0xBFF.

First, it is assumed that, with no write command present in the command buffer 186b, the HDC 182 receives the write command CMD1 from the host and stores the write command CMD1 in the command buffer 186b, at time t11. In this case, when the reception of the write command CMD1 is confirmed (Yes in B201), the reception of the data D[CMD1] is started at time t12 (B202). In the example in FIG. 6, the reception of the data D[CMD1] is completed at time t14.

When the reception of the data D[CMD1] is started, the CPU 184 checks the number N_PLP of blocks in the PLP free space (B203). In this example, N_PLP is assumed to be 0x100. Subsequently, N_NWB is checked (B204). At this time, the writing of the data D[CMD1] to the disk 11 has not been started, and thus, N_NWB is 0x400. Furthermore, no other data has been written to the disk 11. In other words, N_NWB is not less than or equal to N_PLP (No in B205), and flag F is clear (No in B206). In this case, the writing of the data D[CMD1] to the disk 11 is started at time t3, and flag F is set (B210 to B214).

It is assumed that the writing of the data D[CMD1] to the disk 11 (in other words, the writing of the data D[CMD1] to an area ranging from 0x000 to 0x3FF) progresses to LBA=0x2FF by time t15. In this case, N_NWB decreases to 0x100, which is equal to N_PLP. Then, N_NWB is determined to be less than or equal to N_PLP (Yes in B205). A status S[CMD1] is reported to the host (B217). At this time, a PLP area having 0x100 blocks is reserved in association with the write command CMD1 using the management table 186a. In this case, N_PLP decreases from 0x100 to 0x000. The writing of the data D[CMD1] to the disk 11 continues even after the reporting of the status S[CMD1].

Now, it is assumed that, upon receiving the report of the status S[CMD1], the host issues the next write command CMD2 to the HDD and that, as a result, the HDC 18 receives the write command CMD2 at time t16. In this case, when the reception of the write command CMD2 is confirmed (Yes in B201), the reception of the data D[CMD2] is started at time t17 (B202). In the example in FIG. 6, the reception of the data D[CMD2] is completed at time t18.

When the reception of the data D[CMD2] is started, the CPU 184 checks the number N_PLP of blocks in the PLP free space (B203). At this time, N_PLP is 0x000. Subsequently, N_NWB is checked (B204). At this time, the writing of the data D[CMD2] to the disk 11 has not been started, and thus, N_NWB is 0x400. Furthermore, no other data has been written to the disk 11. In other words, N_NWB is not less than or equal to N_PLP (No in B205). Furthermore, the data D[CMD1] is being written to the disk 11, and flag F is set (Yes in B206). In this case, the writing of the data D[CMD2] to the disk 11 and the reporting of the status S[CMD2] are forced to wait.

It is assumed that the writing of the data D[CMD1] to the disk 11 is eventually completed at time t19 (Yes in B207). In this case, the reservation of the PLP area associated with the write command CMD1 (in other words, the PLP area having 0x100 blocks) is cancelled, and flag F is cleared (B208 and B209). Thus, N_PLP increases from 0x000 to 0x100.

Then, the write command CMD2 is selected from the command buffer 186b (B210 to B212). The writing of the data D[CMD2] to the disk 11 is started at time t19, and flag is set again (B213 and B214).

Thus, according to the embodiment, when the writing of the data D[CMD1] to the area ranging from LBA=0x000 to LBA=0x3FF is completed, the writing of the data D[CMD2] to the area ranging from LBA=0x400 to LBA=0x7FF can simultaneously be started. Hence, no rotational delay time for the disk is needed before starting to write the data D[CMD2].

In contrast, according to the conventional technique, the status S[CMD1] is reported at time t19.

In this case, the reception of the data D[CMD2] is started after time t19, and the writing of the data D[CMD2] to the disk 11 is started later than the start of the reception. Hence, the conventional technique needs a rotational delay time for the disk before starting to write the data D[CMD2].

It is assumed that the writing of the data D[CMD2] to the disk 11 (in other words, the writing of the data D[CMD2] to an area ranging from 0x400 to 0x7FF) progresses to LBA=0x6FF by time t20. In this case, N_NWB decreases to 0x100, which is equal to N_PLP. Then, N_NWB is determined to be less than or equal to N_PLP (Yes in B205), and a status S[CMD2] is reported to the host (B217). At this time, a PLP area having 0x100 blocks is reserved in association with the write command CMD2 using the management table 186a. In this case, N_PLP decreases from 0x100 to 0x000 again. The writing of the data D[CMD2] to the disk 11 continues even after the reporting of the status S[CMD2].

Now, it is assumed that, upon receiving the report of the status S[CMD2], the host issues the next write command CMD3 to the HDD and that, as a result, the HDC 18 receives the write command CMD3 at time t21. In this case, when the reception of the write command CMD3 is confirmed (Yes in B201), the reception of the data D[CMD3] is started at time t22 (B202). In the example in FIG. 6, the reception of the data D[CMD3] is completed at time t23.

When the reception of the data D[CMD3] is started, the CPU 184 checks the number N_PLP of blocks in the PLP free space (B203). At this time, N_PLP is 0x000. Subsequently, N_NWB is checked (B204). In this regard, N_NWB is not less than or equal to N_PLP (No in B205), and flag F is set (Yes in B206). In this case, the writing of the data D[CMD3] to the disk 11 and the reporting of the status S[CMD3] are forced to wait.

It is assumed that the writing of the data D[CMD2] to the disk 11 is eventually completed at time t19 (Yes in B207). In this case, the reservation of the PLP area associated with the write command CMD2 (in other words, the PLP area having 0x100 blocks) is cancelled, and flag F is cleared (B208 and B209). Thus, N_PLP increases from 0x000 to 0x100.

Then, the write command CMD3 is selected from the command buffer 186b (B210 to B212). The writing of the data D[CMD3] to the disk 11 is started at time t24, and flag is set again (B213 and B214).

Thus, according to the embodiment, when the writing of the data D[CMD2] to the area ranging from LBA=0x400 to LBA=0x7FF is completed, the writing of the data D[CMD3] to the area ranging from LBA=0x800 to LBA=0xBFF can simultaneously be started. Hence, no rotational delay time for the disk is needed before starting to write the data D[CMD3].

In the embodiment, the backup power supply 150 generates power using the electromotive force of the SPM 13. However, the backup power supply 150 may generate power using a capacitor charged by a power supply voltage applied by the main power supply.

The above-described at least one embodiment allows the status to be reported to the host earlier while securing the write data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a disk;
a nonvolatile cache;
a controller; and
a backup power supply configured to temporarily generate power supplied at least to the nonvolatile cache and the controller when a main power supply to the magnetic disk device is interrupted, wherein the controller is configured to:
start to receive first data of a data length specified in a first write command when receiving the first write command from a host;
start to write the first data to the disk in accordance with the first write command; and
report a status for execution of the first write command to the host depending on whether or not a second capacity of data not yet written to the disk is less than or equal to a first capacity of a first free space in the nonvolatile cache, the first free space being available to save data during a first period when the backup power supply enables power to be supplied, the second capacity decreasing as writing of the first data to the disk progresses.

2. The magnetic disk device of claim 1, wherein the controller is configured to:
compare a capacity Qd of data capable of being written to the nonvolatile cache during the first period with a capacity FS of a physical free space in the nonvolatile cache;
determine a capacity equal to FS to be the first capacity when Qd is greater than or equal to FS; and
determine a capacity equal to Qd to be the first capacity when Qs is smaller than FS.

3. The magnetic disk device of claim 2, wherein the controller is configured to report the status for the execution of the first write command to the host before starting to write the first data to the disk.

4. The magnetic disk device of claim 2, wherein the controller is configured to start to write the first data to the disk when the second capacity is larger than the first capacity and data writing to the disk is not in execution.

5. The magnetic disk device of claim 2, wherein the controller is configured to start to write the first data to the disk after writing to the disk second data specified in a second write command different from the first write command is completed, when the second capacity is larger than the first capacity and the first write command is received while writing of the second data is in execution in accordance with the second write command.

6. The magnetic disk device of claim 1, wherein the controller is configured to report the status for the execution of the first write command to the host before starting to write the first data to the disk.

7. The magnetic disk device of claim 1, wherein the controller is configured to start to write the first data to the disk when the second capacity is larger than the first capacity and data writing to the disk is not in execution.

8. The magnetic disk device of claim 1, wherein the controller is configured to start to write the first data to the disk after writing to the disk second data specified in a second write command different from the first write command is completed, when the second capacity is larger than the first capacity and the first write command is received while writing of the second data is in execution in accordance with the second write command.

9. The magnetic disk device of claim 8, further comprising a command buffer in which a write command received from the host is temporarily stored,
wherein the controller is configured to start to write data specified in a write command to be executed next to the disk in accordance with a plurality of write commands to be newly executed which include the first write command when the plurality of write commands is stored in the command buffer, the plurality of write commands being reordered based on ranges of writing specified in the plurality of write commands, respectively.

10. The magnetic disk device of claim 9, wherein the controller is configured to reorder the plurality of write commands such that the disk is most efficiently accessed when the plurality of write commands is executed.

11. The magnetic disk device of claim 1, wherein the controller is configured to save data not yet written to the disk to the nonvolatile cache using the backup power supply when the main power supply is interrupted after reporting of the status.

12. The magnetic disk device of claim 11, further comprising a volatile cache,
wherein the controller is configured to:
store the first data in the volatile cache;
write the first data stored in the volatile cache to the disk; and
save the data not yet written to the disk and left in the volatile cache to the nonvolatile cache using the backup power supply when the main power supply is interrupted after the reporting of the status.

13. A method for executing a write command in a magnetic disk device comprising a disk, a nonvolatile cache, and a backup power supply, the method comprising:
starting to receive first data of a data length specified in a first write command when receiving the first write command from a host;
starting to write the first data to the disk in accordance with the first write command;
determining whether or not a second capacity of data not yet written to the disk is less than or equal to a first capacity of a first free space in the nonvolatile cache, the first free space being available to save data during a first period when the backup power supply enables power to be supplied, the second capacity decreasing as writing of the first data to the disk progresses; and
reporting a status for execution of the first write command to the host depending on a result of the determination.

14. The method of claim 13, further comprising:
comparing a capacity Qd of data capable of being written to the nonvolatile cache during the first period with a capacity FS of a physical free space in the nonvolatile cache;
determining a capacity equal to FS to be the first capacity when Qd is greater than or equal to FS; and
determining a capacity equal to Qd to be the first capacity when Qs is smaller than FS.

15. The method of claim 13, further comprising reporting the status for the execution of the first write command to the host before starting to write the first data to the disk.

16. The method of claim 13, further comprising starting to write the first data to the disk when the second capacity is larger than the first capacity and data writing to the disk is not in execution.

17. The method of claim 13, further comprising starting to write the first data to the disk after writing to the disk second data specified in a second write command different from the first write command is completed, when the second capacity is larger than the first capacity and the first write command is received while writing of the second data is in execution in accordance with the second write command.

18. The method of claim 17, wherein:
the magnetic disk device further comprises a command buffer in which a write command received from the host is temporarily stored; and
the method further comprises starting to write data specified in a write command to be executed next to the disk in accordance with a plurality of write commands to be newly executed which include the first write command when the plurality of write commands is stored in the command buffer, the plurality of write commands being reordered based on ranges of writing specified in the plurality of write commands, respectively.

19. The method of claim 13, further comprising saving data not yet written to the disk to the nonvolatile cache using the backup power supply when the main power supply is interrupted after reporting of the status.

20. The method of claim 19, wherein:
the magnetic disk device further comprises a volatile cache; and
the method further comprises
storing the first data in the volatile cache;
writing the first data stored in the volatile cache to the disk; and
saving the data not yet written to the disk and left in the volatile cache to the nonvolatile cache using the backup power supply when the main power supply is interrupted after the reporting of the status.

* * * * *